(12) United States Patent
Lucignano et al.

(10) Patent No.: US 10,681,437 B2
(45) Date of Patent: Jun. 9, 2020

(54) METHOD FOR MAKING A MULTILAYER TEXTILE STRUCTURE FOR PROTECTING ACOUSTIC DEVICES, METHOD FOR MAKING A COMPONENT FOR PROTECTING ACOUSTIC DEVICES BY THE MULTILAYER TEXTILE STRUCTURE AND THE OBTAINED ACOUSTIC DEVICE PROTECTING COMPONENT

(71) Applicant: Saati S.P.A., Appiano Gentile (IT)

(72) Inventors: Carmine Lucignano, Appiano Gentile (IT); Paolo Canonico, Appiano Gentile (IT)

(73) Assignee: SAATI S.P.A., Appiano Gentile (CO) (IT)

(*) Notice: Subject to any disclaimer, the term of this patent is extended or adjusted under 35 U.S.C. 154(b) by 19 days.

(21) Appl. No.: 15/766,131

(22) PCT Filed: Oct. 4, 2016

(86) PCT No.: PCT/IB2016/001434
§ 371 (c)(1),
(2) Date: Apr. 5, 2018

(87) PCT Pub. No.: WO2017/060765
PCT Pub. Date: Apr. 13, 2017

(65) Prior Publication Data
US 2019/0124427 A1    Apr. 25, 2019

(30) Foreign Application Priority Data

Oct. 5, 2015  (IT) .............................. UB2015A4103

(51) Int. Cl.
*H04R 1/02* (2006.01)
*B32B 37/12* (2006.01)
(Continued)

(52) U.S. Cl.
CPC ............... *H04R 1/023* (2013.01); *B32B 7/14* (2013.01); *B32B 27/40* (2013.01);
(Continued)

(58) Field of Classification Search
None
See application file for complete search history.

(56) References Cited

U.S. PATENT DOCUMENTS

| 4,816,320 A * | 3/1989 | St Cyr | A47K 10/16 |
| | | | 428/198 |
| 2004/0028851 A1* | 2/2004 | Okhai | B32B 3/266 |
| | | | 428/35.2 |

(Continued)

FOREIGN PATENT DOCUMENTS

| IT | MI20100685 A1 | 10/2011 |
| WO | 2011/132062 A1 | 10/2011 |

(Continued)

OTHER PUBLICATIONS

Yu, Yueping. google translation of CN1453422. "Making process and special apparatus for hydrophobic permeable facing material with covered film". Nov. 5, 2003. pp. 1-6.*

(Continued)

*Primary Examiner* — Qin Zhu
(74) *Attorney, Agent, or Firm* — Hedman & Costigan, P.C.; James V. Costigan; Kathleen A. Costigan

(57) ABSTRACT

A method for laminating or coupling a first and second precision fabric layers each being formed by weaving a plurality of synthetic monofilaments to achieve a two-layer textile structure, for application to loudspeakers and microphones of electronic devices in general providing at least an audio function, either a sound emitting (voice or music) or receiving function, both for protecting said electronic device from water and solid particle intrusion and for preserving the (Continued)

designed sound emitting and receiving characteristics, the method comprising coupling the first and second layers by a glueing material sprayed on the synthetic monofilaments of at least one of the first and second precision fabric layers.

5 Claims, 2 Drawing Sheets

(51) Int. Cl.
    *H04R 1/08*     (2006.01)
    *B32B 37/24*     (2006.01)
    *B32B 27/40*     (2006.01)
    *B32B 7/14*     (2006.01)
    *B32B 38/00*     (2006.01)
    *B32B 38/04*     (2006.01)
    *C09J 175/04*     (2006.01)
    *B32B 5/02*     (2006.01)

(52) U.S. Cl.
    CPC .......... *B32B 37/1284* (2013.01); *B32B 37/24* (2013.01); *H04R 1/086* (2013.01); *B32B 38/0008* (2013.01); *B32B 2037/243* (2013.01); *B32B 2038/047* (2013.01); *B32B 2305/18* (2013.01); *B32B 2307/10* (2013.01); *B32B 2457/00* (2013.01)

(56) References Cited

U.S. PATENT DOCUMENTS

| | | | |
|---|---|---|---|
| 2005/0107564 A1* | 5/2005 | Klingenberg | C08G 18/0823 528/44 |
| 2013/0032285 A1 | 2/2013 | Mietta | |
| 2013/0294002 A1* | 11/2013 | Thompson | H05F 3/00 361/212 |
| 2015/0343736 A1* | 12/2015 | Kawka | H01M 2/1653 429/144 |
| 2016/0247499 A1* | 8/2016 | Sanders | B32B 5/028 |
| 2016/0278249 A1* | 9/2016 | Lucignano | H05K 9/009 |
| 2017/0305109 A1* | 10/2017 | Nathaniel | B32B 5/02 |

FOREIGN PATENT DOCUMENTS

| | | |
|---|---|---|
| WO | 2015/028907 A1 | 3/2015 |
| WO | 2015/057693 A1 | 4/2015 |

OTHER PUBLICATIONS

International Search Report for PCT/IB2016/001434 dated Apr. 5, 2017.
Written Opinion of the International Searching Authority dated Apr. 5, 2017.
International Preliminary Report on Patentability dated Jan. 24, 2018.
English Abstract for IT MI20100685 A1 dated Oct. 22, 2011.

\* cited by examiner

METHOD FOR MAKING A MULTILAYER TEXTILE STRUCTURE FOR PROTECTING ACOUSTIC DEVICES, METHOD FOR MAKING A COMPONENT FOR PROTECTING ACOUSTIC DEVICES BY THE MULTILAYER TEXTILE STRUCTURE AND THE OBTAINED ACOUSTIC DEVICE PROTECTING COMPONENT

BACKGROUND OF THE INVENTION

The present invention relates, according to a first aspect thereof, to a method for making a multilayer textile structure.

By the term "multilayer" it will be hereinafter designed a textile structure consisting of two layers, which has been specifically designed for protecting electronic acoustic components, such as microphones, loudspeakers, and so on, built-in in devices of different sizes, and consisting of two overlapping synthetic monofilament precision fabric layers, glued to one another thereby providing a diffuse joining thereof, an optimum evenness of the gluing material distribution, and an optimum adhesion of the two layers.

Moreover, by the words "synthetic monofilament precision fabric" it will be designed a fabric made by any known weaving method, whose weaving parameters are precisely controlled, for example to provide very even mesh openings of the mesh arrangement made of synthetic monofilaments, whose size parameters and physical properties are accurately controlled to provide a fabric which, through all the area portions thereof, has, for emission and reception acoustic waves, such an impedance as not to attenuate said acoustic waves, that is to render the fabric "transparent" for said acoustic waves, while providing a protection from a possible penetration of polluting particles, as required for a proper operation of the electroacoustic component.

The present invention also relates, in a second aspect thereof, to a method for making, starting from the above mentioned "multilayer" fabric, protecting pieces or components, as properly pre-dimensioned and assembled, to be used in electronic devices, such as audio gates, loudspeakers, microphones or the like devices.

In other words, the application field of the present invention is the macro-area of all the electronic devices which are made either in small or large series, including at least an audio function, that is either a sound (voice or music) emission, such as loudspeakers or the like devices, or a sound reception, such as microphones in general.

To the above mentioned broad group of devices pertain several component families and sub-families, for example the following:

Telephonic field:
Cellular phones
Products for fixed line telephony (for example phones, hand-free assemblies and related fittings)
Skype/SAT phones
Communication field:
Walkie-talkies
Audio devices built-in in helmets and the like
Professional radios, for example for military, safety, civil protection, outdoor work applications and the like
Entertainment:
Portable Hi-Fi devices (MP3 players, earphones, headsets, portable speakers)
Professional audio devices (microphones, headsets, loudspeaker components)
TVs (LCDs, monitors, portable DVD players)
Transports
Satellite navigator systems including voice signaling properties
Automotive applications (Car Hi-Fi, handsfree, voice warning applications)
Indoor communication devices (trains, airplanes, ships).
Other applications:
Computers (monitor speakers, external speakers, additional microphones, webcams)
Domestic application devices (interphones, indoor audio communication devices)
Acoustic apparatus for ear impaired persons and other healthcare apparatus In particular, the preferred inventive application field is that of indoor acoustic components, such as loudspeakers and microphones. These components are very delicate and, as stated, must be protected against water and solid particle (dust, waste, dangerous fragments) intrusions, while preventing the protecting system from negatively affecting the designed sound emitting and receiving characteristics.

The above involves a very complex pattern of functional requirements for the mentioned acoustic components, which must combine good sound transmission characteristics (achieved by using large openings through the device outer shell) with an efficient protection of the component itself (which, on the contrary, requires to insulate as much as possible an acoustic component from the outside environment).

The main solution for solving the above mentioned problems, in a standard condition, is that of applying porous protecting means on the outer openings, which latter, for example in a cellular phone, are usually three and are arranged at the main loudspeaker (or "earpiece"), at the microphone and at the hands-free/sound loudspeaker (or "loudspeaker" proper).

In order to protect the acoustic component, the prior art provides several solutions, depending on the desired application requirements, the type and the degree of protection to be assured, and on whether or not a screening of magnetic field is required.

The above general solution may constitute a basis for studying or designing specific derived approaches, suitably synthesized and arranged according to an increasing order based on the protection level to be achieved, that is:

2.1. No protection, that is the acoustic component is exposed to the outside environment (which is an uncommon solution)

2.2. Plastics molded protecting bars or grids, with an anti-impact function only 2.3. Wide mesh opening protecting nets, made of a metal material (for example a spherical protection device for microphones) or molded of a plastics material and having an anti-intrusion function against small articles (such as pencils and so on)

2.4. A non-woven material screen, with an optional hydrophobic processing, arranged in front of the acoustical component to be protected 2.5. A synthetic monofilament technical fabric screen, optionally hydrophobically processed 2.6. A hydrophobic membrane The above first three solutions do not provide a protection against liquids, but only a limited efficiency against solid middle-large size articles (2.2. and 2.3. above).

On the contrary, the solutions from 2.4. to 2.6. provide a good protection even against a possible intrusion of liquids and powder into the acoustic component.

Of course, an overlapping or stacking of several protecting/screening material layers would tend to worsen the acoustic performance of the component, since the overlapping layers represent an additional obstacle to a normal airflow. An optimum approach would be that of providing protecting/screening media having a low acoustical impedance or, if possible, finding a tradeoff between the required protection level and the acoustic impedance.

In the most common cases, such as in cellular phones, the protecting screens are assembled to synthetic foamed material gaskets and biadhesive tape templates, to provide a full adhesion of the screen to the apparatus outer body. It should be apparent that, in case of a plurality of layers designed for protecting/screening the acoustic component, the fittings required for assembling the screen (such as gaskets/adhesive tape), as well as the assembling steps and the overall thickness will greatly increase depending on the number of the protecting/screening layers used.

As stated, from an acoustic standpoint, the optional protecting screen should not negatively affect the input and output sound flow compared to that provided in designing the component.

Usually, for most of the wide consumption acoustic products, it is necessary to minimize the attenuation of the sound pressure level. Accordingly, the protecting screen must be "acoustically transparent" to provide its protective function while interfering as little as possible with the acoustic component input or output sound waves.

The above is very common for cellular phones, in which the protecting screen must not excessively attenuate the speaker sound or the microphone sensitivity, thereby allowing to use small, light and economical acoustic assemblies.

In other cases, in particular in average/high range acoustic products, it is on the contrary desired that the protecting screen provides a proper acoustic function, so as to level possible emitting peaks or distorted sounds, thereby properly balancing the acoustic component frequency response.

In all the above cases, the textile material component, either a woven, non-woven or membrane, should have the exact acoustic characteristics of the designing project, varying depending on the requirements from a maximum "acoustic transparence" feature to a set sound level damping effect.

To properly quantify the above mentioned acoustic characteristics, it is possible to use different quantifying methods:

The "specific airflow resistance" (ASTM C522-87), which relates the load to the loss rate in case of a stationary airflow passing through the textile product. The results are given as Rayls MKS, and to low values of this parameter correspond "acoustically transparent" materials.

The "acoustic impedance" value, which is based on the same parameters as the preceding case, but is measured for an alternating airflow regimen, that is under conditions more adhering to the acoustic application real conditions.

Finally, if it is not possible to directly test the acoustic screen in its final configuration (shape and size identical to those of a commercial product), then a direct measurement of the sound pressure, either with or without the textile screen arranged between sound source and measurement microphone, should be performed. The result of this test is usually expressed as decibels, dB(SPL), based on different standardized methods (ISO/FDIS 7235:2003 or the like).

The International Standard IEC60529 defines the so called "Ingress Protection" index with reference to some more or less stringent testing conditions, in which the electronic component shell or casing is subjected to an intrusion of solid objects-articles or of water.

The first digit of the IP index relates to the resistance against the intrusion of solid materials. Levels from IP1X to IP4X are usually of a low interest for the acoustic components, which, on the contrary, nearly always require the IP5X level, assuring a partial protection against a powder intrusion. A requirement of an IP6X level, providing a perfectly sealed component, is per se uncommon.

The second digit of the IP index relates to the water resistance. The IPX3, IPX4 and IPX5 levels show resistance against water sprays of several intensities. Usually, for the most common products, such as cellular phones, an IPX3 level is sufficient. On the contrary, a "heavy duty" acoustic product may require a protection level up to IPX8, corresponding to a water immersion resistance up to a depth of 10 meters for periods up to 24 hours. These are obviously very stringent conditions for specific applications.

As stated, at present several technical solutions are used, based on different textile products (non-woven, synthetic monofilament technical woven fabrics, hydrophobic membranes) providing the acoustic and protecting performance imposed by modern acoustic products (including the multilayer synthetic materials taught in patent No. MI2010A000685 to the same Applicant).

With reference to the acoustic properties, mechanical strength, processing capability and geometric consistency, in a protection range against >7 µm particles and a hydrophobic capability of an IPX4 class, the Applicant has surprisingly found that the synthetic monofilament technical fabrics, which will be disclosed in a more detailed manner hereinafter, represent an optimum solution to the above mentioned protection and minimum acoustic attenuation problems.

Moreover, for merely aesthetic reasons, for properly protecting the acoustic component it is frequently required to use a very large mesh opening fabric material, either metalized or not. Moreover, for mechanical reasons, is sometimes preferred a fabric adapted to provide a good stiffness protecting layer, and also adapted to provide a good resistance against intrusion.

However, if on one side such a fabric negatively affects only to a minimum degree the acoustic performance of the component to be protected, on the other side the protection level against liquid or particle intrusion is excessively low.

Thus, from the above is self-evident the need (whose satisfaction constitutes the main object of the present invention) to increase in an optimum manner the protection level against liquid and particle intrusion, while preserving a desired minimum attenuation of the acoustic waves in the above mentioned applications of the above acoustic components.

The Applicant has achieved the above aim by using a further layer, or monofilament precision fabric layer, characterized by very small mesh openings, and suitably coupled or laminated to a larger mesh opening arrangement.

In this connection it should be pointed out that a use of such a further fabric layer in front of the acoustic component to be protected would render very difficult to achieve a proper overlapping or stacking assembling, since between each of the two involved layers, the component and the outer casing, it would be necessary to apply suitable adhesive and gasket materials; thus it is necessary to simplify as much as possible such an assembling.

According to the present invention, this further object has been achieved by coupling or laminating the two above mentioned synthetic monofilament precision fabric layers by a novel method, constituting the core of the present invention, providing a diffuse joining between the two fabric layers, thereby transforming the two laminated or coupled layers into an integral monolithic unit easily and quickly assembled to its housing or casing.

The above novel and inventive coupling method is moreover very advantageous for a proper post-processing of the fabric and for assembling it in the target electronic device to meet all the desired acoustic and protection characteristic requirements thereof.

In other words, the subject novel and inventive laminating or coupling method for coupling the inventive fabric material has been specifically designed for:

Providing a diffuse joining of the two fabric layers

Assuring a good adhesion level between said layers, even if low surface energy coatings are deposited on the fabric, to increase a desired protection against liquid intrusion Assuring an absolute evenness of the adhesion strength and the airflow resistance The laminating method according to the present invention overcomes the great drawbacks of prior laminating methods, for example the HOT MELT method, using different types of reactive polyurethane or thermoplastic polymer materials, or other methods using a coating system for depositing the glue material by spreading on one of the layers and by a successive calender laminating, and in which, for preventing a full or nearly full closure of the fabric mesh openings by the coated glue material, a metering of a proper glue amount is achieved by glue spreading cylinders engraved with different engraving patterns, which implies following drawbacks:

A diffuse joining only at a macroscopic level. If, in particular, for the intended application it is necessary to make small pieces, having a size comparable to the pitch between two glue spots, then the pieces will be either partially or fully delaminated The adhesion level between the two layers is not consistent, since to a variation of a position on the fabric large variations of the measured load will correspond To the above, the further drawback should be added that, since a typical size of a protecting piece is generally in the order of hundreds of microns, which is comparable to the size of the coating glue material spot pattern, the operating properties between different pieces made from the same protecting fabric roll and being glued in a contact relationship will be inconsistent, because, at glue spots/lines, a great airflow resistance occurs with a consequent comparatively great acoustical impedance increase and, vice versa, in an area between two glue spots, the airflow resistance will be low.

On the contrary, the laminating method according to the present invention is a truly spraying method, that is without contacts, thereby it is much more operatively flexible, independently of the pattern and depth of the glue spots/lines engraved on the laminating cylinder.

In fact, the method according to the present invention provides that the two fabric layers to be laminated are caused to pass with a set speed, under a plurality of spraying nozzles, thereby, by adjusting the fabric feeding speed and the nebulizing or atomizing of the glue material (the opening and pressure thereof), the deposited glue amount can be precisely determined.

If the glue nebulization or atomization is a very fine one, it is possible to deposit very small glue droplets, distributed through the fabric threads with a nearly continuous distribution, thereby negatively affecting only to a very small degree the airflow resistance.

In a preferred embodiment of the method according to the invention, an aqueous polyurethane glue material sprayed on both the layers to be laminated is used.

After the spraying step, according to the present invention, the fabric is caused to pass, with a set speed, through a tunnel oven to evaporate water present in the glue material.

Advantageously, as above stated, the method is carried out starting from rolls, thereby upstream of the spraying station and downstream of the tunnel drying oven, unwinding and winding systems will be arranged, respectively.

In a preferred embodiment of the present invention, the glue material used contains a locking catalyzer, for example of a polyurethane type, to lock, according to the present invention, the cross-linking of the sprayed glue material.

Thus, after drying, the fabric rolls may be easily stored, since the fabric will be devoid of any residual adhesive.

To reactivate the glue material it is sufficient to apply a set temperature for a set period of time for properly starting the cross-linking process.

To properly heat the two fabric layers and apply a pressure required to achieve the glued coupling, it is preferred to use a heated calender, heating the two fabric layers and reactivating the glue material, and to connect the two layers by the calender applied pressure.

The inventive method, as hereinabove disclosed, by spray coating and laminating provides a two-layer fabric structure particularly suitable for the above disclosed acoustic applications, the fabric structure having:

A diffuse joining

A good adhesion level between its two fabric layers, even when they have low surface energy coatings deposited thereon, to increase a protection against liquid intrusion A very homogeneous or consistent adhesion level A very homogeneous or consistent airflow resistance, owing to a truly homogeneous distribution of the sprayed glue material.

The preceding steps of the method according to the present invention are shown and resumed in the accompanying schematic drawings, which constitute an integrating part of the present disclosure and relate here to a use in a cellular phone, but which, however, may be used in any other electronic device having analogous acoustic functions, of the above indicated type.

DESCRIPTION OF THE PREFERRED EMBODIMENTS

Figure 1:
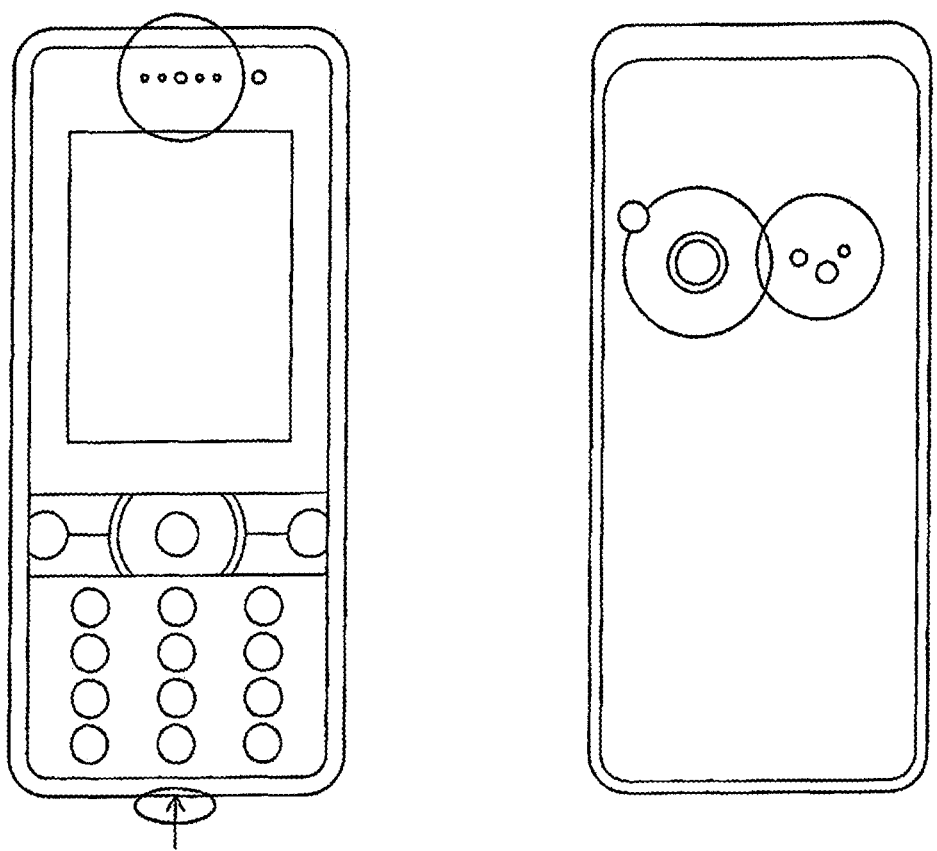
FIG. 1 shows a schematic view of a plurality of substantially circular die-cut parts made of the two-layer fabric structure according to the method of the present invention, as above disclosed.
Figure 1:
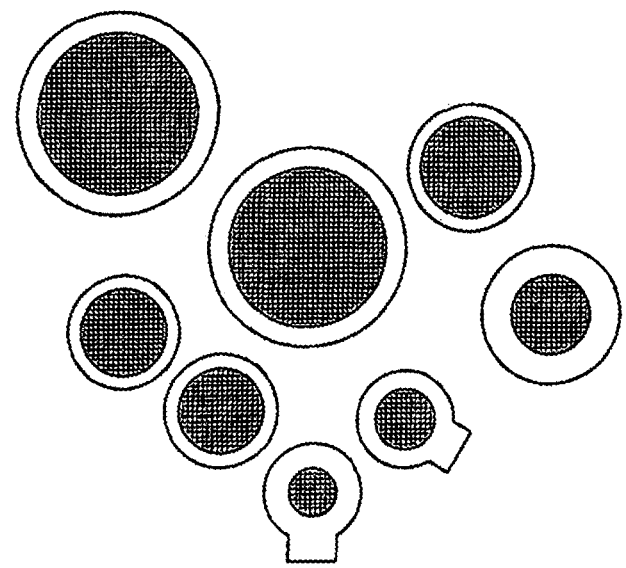
Figure 2:
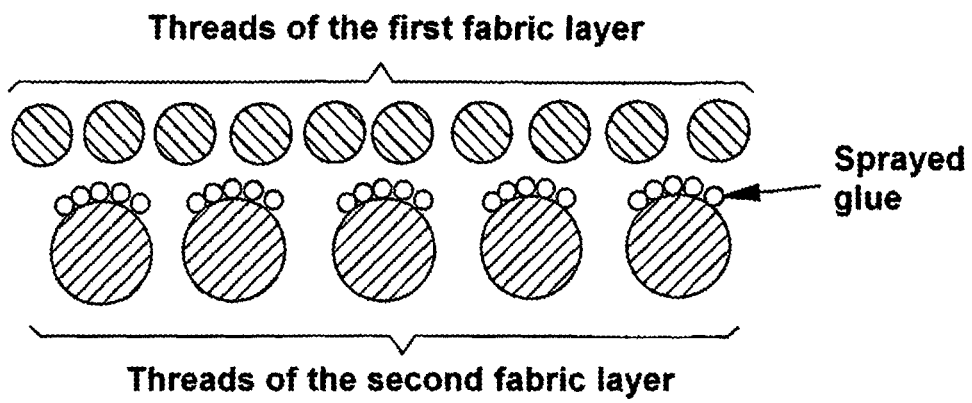
FIG. 2 shows a further schematic view of two fabric layers, with different diameter threads, and in which the glue layer is sprayed only on the fabric bottom layer threads.
Figure 3:
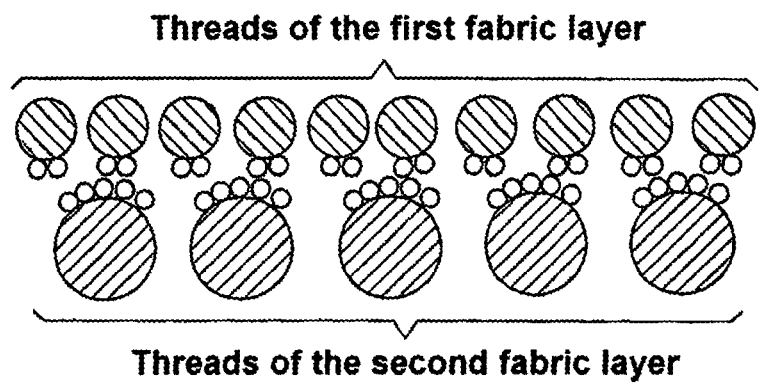
FIG. 3 shows a further schematic view of the method according to the present invention in which the glue is sprayed on both the fabric layers, that is on the threads of the top layer having a less diameter and on those of the bottom layer having a larger diameter; in this connection it should be pointed out that even though in FIGS. 2 and 3 the threads of the two layers are shown as different diameter threads, they could also have a same diameter.
Figure 4:
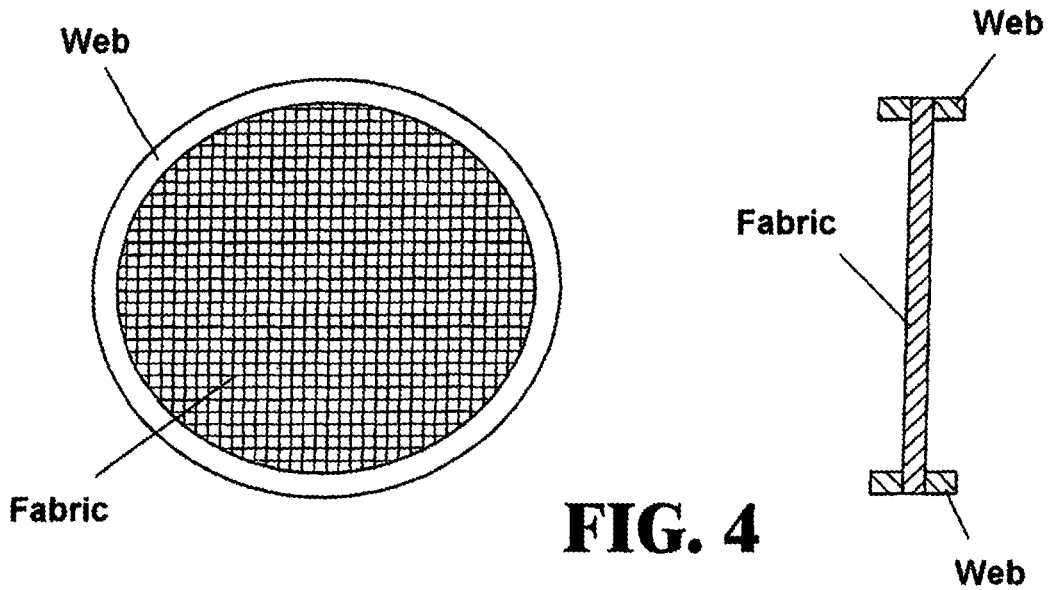
FIG. 4 shows a further schematic view of a die-cut part made of the laminated double layer fabric of the invention and by the inventive method.

From the above disclosure it should be apparent that, in a first aspect, the present invention provides a synthetic monofilament two-layer textile fabric structure, having specifically designed or target geometrical, aesthetic, mechanical and acoustic properties, and including two overlapping layers coupled or laminated by a glue spraying method and a further laminating method, to be used in electronic consumer products as a protecting element for protecting electric-acoustic components, built-in in different size devices.

The above textile two-layer structure provides desired protection levels against an intrusion of particles and fluids while providing an acoustic attenuation level precisely corresponding to the designed one.

Said structure has very even mechanical, geometrical and functional properties, also in relation to the typical sizes of the pieces used in these applications. Said structure, moreover, owing to the very good adhesion properties thereof, may be further processed according to standard processing methods, for making and end or finished piece, and for an easy assembling in the device.

The above two-layer or multilayer textile structure is made by a novel method of depositing by spraying a glue material and then laminating a synthetic monofilament precision fabric, which may be made of a PET, PA, PP, PEEK, PPS thread having a thread diameter from 19 to 500 µm, a thread/centimeter density from 260 to 4 and a thread thickness from 35 µm to 1 mm.

Moreover, the fabric may have a mesh opening from 5 µm to 1 mm and, if desired, may be further coated by coating processes, such as dip coating, plasma coating, spray coating, foam coating, knife coating, sol gel and ink-jet coating, providing the fabric with target surface properties such as hydrophobic, antistatic, hydrophilic, dirt releasing and antimicrobic properties.

The inventive fabric may also be coated by physical or chemical deposition processes, by thin material layers for example of silver, copper, aluminium, steel, titanium, titanium nitride, chromium, chromium carbide, and so on.

Preferably, in a preferred embodiment of the invention, the textile double layer structure of the invention has a thickness of 170 µm, a weight of 114 g/m$^2$, and accordingly about 10 g/m$^2$ glue, an air permeability of 1330 lm$^2$/s, as measured under a pressure drop of 200 Pa, an acoustic impedance of 140 Rayls, and a very even delaminating resistance all along the fabric piece, of about 3.4 n/5 a.

In a further aspect, the present invention also relates to a method for making protecting components or pieces starting from the textile structure made by the method of the invention, and being assembled and packaged with suitable adhesive materials on both sides, to be further integrated or built-in in the end electronic device, for protecting the desired electric/acoustic component.

For such an application, in an end "stacking-up", the two-layer fabric is arranged between the component and the outer casing thereof and, if necessary, gasket elements are applied to proper control the geometric tolerances.

To properly integrate the fabric in the stack-up arrangement, said fabric is laminated on both sides by suitable adhesive materials assuring a proper adhesion with other operating surfaces (gasket and/or component and/or housing) and an airflow through the active part of the fabric, arranged in front of the acoustic component.

For example, for a circular fabric piece to be arranged in front of a microphone, the adhesive or glue material will have a circular crown shape, with an inner diameter larger than the active part diameter, and an outer diameter equal to that of the fabric part. Thus, by the adhesive material circular crown, the fabric may be glued to other surfaces, while precisely preserving the characteristics or properties of the fabric at an active part thereof.

To make the end component, the fabric according to the present invention is then cut into ribbons having preferably a width from 10 to 50 mm, suitable for a following processing operation.

According to a preferred embodiment of the present invention, an adhesive tape or strip to be used (in a roll form) supported by a suitable carrier or support element, is unwound and fed to a machine where, by a flat or cylindric mold, the adhesive and carrier are pre-drilled depending on an active area of the component and accordingly of the fabric. Likewise, a further adhesive and carrier roll will be prepared, and the fabric/multilayer ribbon is then laminated with one of the pre-prepared adhesive strips, with a further laminating of the other fabric surface, with the other adhesive or glue layer as suitably prepared, by an operating step suitable to provide the perforated parts of the two adhesive materials in a perfectly aligned condition.

Then, one of the two carriers of the adhesive or glue material is removed, and the assembly is laminated by a liner (typically a mylar film).

Then, the stack thus formed is cut through according to desired dimensions (in particular of the outer diameter of the adhesive or glue circular crown and the liner desired configuration).

From the above disclosure it should be apparent that the present invention has provided:

1. According to a first aspect thereof, a multilayer textile product of which at least one of the two layers has been processed by a spraying depositing of the glue material on either one or both sides thereof and a following lamination for a use as a sub-component in acoustic and electronic products in general, to protect electronic acoustic components such as microphones, loudspeakers, built-in in a different size device, the textile product comprising a lamination of two synthetic monofilament precision fabrics, being achieved by the method according to the present invention, that is a depositing or coating by spraying and laminating, thereby providing a diffuse joining of the two layers, an optimum evenness of the material distribution, and an optimum adhesion between the layers, in which the starting properties of the monofilament fabrics used and the specific coupling method therefor are such as to assure the required protection and acoustic properties for a proper operation of the component.

2. A multilayer textile product according to aspect 1, for an application according to said aspect 1, being laminated with two polymeric biadhesive tapes, suitably contoured as to hold a perspiring of the fabric at the active part thereof while allowing an adhesion/assembling with gasket elements, acoustic component to be protected and outer casing of the electronic device, such as a cellular phone, a tablet, a computer.

3. Complete or finished functional sub-assemblies containing the components according to aspects 1-2, joined to further optional sub-components such as supports, acoustic channels or chambers, which are conventionally molded of a plastics material or made in any other suitable manner, optionally including the acoustic member itself, such as a loudspeaker or microphone.

4. The products of aspects 1 and 2, which may comprise a synthetic monofilament technical fabric material of PET, PA6, PA6.6, PP, PEN, PBT, PE, PEEK, PPS, PI, of a different construction with variable thread number/cm, thread diameter, weaving, finishing.

5. Aspect 4 being susceptible to be extended to textile constructions of any desired weaving and geometry.

6. Aspect 4 being moreover susceptible to be extended to optionally finished starting fabrics, for example dyed for cosmetic objects, and being coated by hydrophobic, hydrophilic, antistatic and antimicrobic coatings.

7. Aspect 4 being moreover susceptible to be extended to starting fabrics optionally coated by physical or chemical deposition systems, with thin layers of metals, oxides, carbides, nitrides, such as aluminium, steel, copper, chromium, titanium and mixtures thereof.

8. A textile product according to aspects 1-2, in which the glue material used for making the multilayer construction is an aqueous base polyurethane, the cross-linking thereof being locked or shut-off in the depositing step.

9. A textile product according to aspects 1-2, the glue material thereof being sprayed by a spraying method, with a fine nebulization or atomization, to provide a ultra-fine dispersion of glue droplets on the fabric threads, thereby holding substantially unaltered the starting fabric acoustic properties.

10. A textile product according to aspects 1-2, wherein the laminating of the two fabric layers as suitably made, according to the aspects 8/9, is achieved by using a heated calender.

11. A textile product according to aspect 2, with several dimensions and geometries of the fabric and its active part.

12. A textile product according to aspect 2, with different tape dimensions, thickness, pattern and chemical nature.

Although the invention has been disclosed with reference to currently preferred embodiments thereof, it should be apparent that the disclosed embodiments are susceptible to several modifications and variations, all coming within the scope of the invention.

The invention claimed is:

1. A method for laminating or coupling a first and second precision fabric layers, each being formed by weaving a plurality of synthetic monofilaments, to provide a textile structure including two textile structure layers to be applied in particular to loudspeakers and microphones of electronic devices in general, having at least an audio function for emitting and receiving sounds, voice or music, and for protecting said electronic devices from water and solid particle intrusion, and preserving the sound emitting and receiving characteristics designed for said electronic devices, said method being characterized in that it comprises a step of spraying a glue material on said synthetic monofilaments of at least one of said first and second precision fabric layers thereby coupling in a diffuse manner said first and second layers, said method comprising the steps of:
   a) providing rolls of said first and second synthetic monofilament precision fabric layers;
   b) providing a plurality of spraying stations including a corresponding plurality of spraying and atomizing nozzles for spraying and atomizing said aqueous glue material;
   c) providing drying tunnel oven means;
   d) providing an unwinding system upstream of said spraying stations and a winding system downstream of said drying tunnel oven, respectively;
   e) providing conveying means for conveying said first and second fabric layers;
   f) unwinding said first and second fabric layers from said rolls thereof;
   g) conveying said first and second fabric layers under said spraying means and evenly spraying and nebulizing on said synthetic monofilaments droplets of said aqueous glue material;
   h) further conveying said first and second fabric layers through said tunnel oven to evaporate water contained in said aqueous glue material and dry said first and second fabric layers, said method being moreover characterized in that said aqueous glue material contains a locking catalyzer adapted to lock or stop the cross-linking of said aqueous glue material in said spraying step g) and wherein, after said drying step h), said method comprises the further step of:
   i) winding into rolls said first and second dried fabric layers devoid of any remaining adhesive property.

2. A method according to claim 1, characterized in that said method comprises the further steps of unwinding from said rolls said first and second fabric layers and heating and pressing in a heated calender said first and second fabric layers to reactivate and polymerize said glue material for gluing to one another in a diffuse manner said first and second fabric layers.

3. A method for making a protecting component for protecting acoustic devices, loudspeakers, microphones and any electronic device including at least an audio function, either a sound (voice or music) emitting or receiving function, said component having an active area, said method being characterized in that it comprises the steps of:
   a1) providing a textile structure by a method according to claim 1;
   b1) cutting said textile structure into webs having preferably a width from 10 to 50 mm;
   c1) providing a first roll of a first adhesive strip supported by a respective first supporting element;
   d1) providing a second roll of a second adhesive strip supported by a respective second supporting element;
   e1) unwinding said first adhesive strip from said first roll and applying said first adhesive strip to a first surface of said web of said textile structure;
   f1) perforating said first adhesive strip and said first supporting element therefor depending on said active area of said component;
   g1) unwinding said second adhesive strip from said second roll and applying said second adhesive strip to the second opposite surface of said web;
   h1) perforating said second adhesive strip and said second supporting element therefor;
   l1) removing one of said first and second supporting elements;
   m1) laminating the assembly achieved from the steps a1) to l1) by a coating film.

4. A method according to claim 1, characterized in that it further comprises providing a two-layer fabric structure having a thickness of 170 μm, a weight of 114 g/m$^2$, with about 10 g/m$^2$ of said glue material, an air permeability of 1330 l/m$^2$s measured at a pressure drop of 200 Pa, an acoustic impedance of 140 Rayls, and an even delaminating resistance of about 3.4 m/5 cm.

5. A method according to claim 3, characterized in that said textile structure of said step a1) has a thickness of 170 μm, a weight of 114 g/m$^2$, with about 10 g/m$^2$ of said glue material, an air permeability of 1330 l/m$^2$s measured at a pressure drop of 200 Pa, an acoustic impedance of 140 Rayls, and an even delaminating resistance of about 3.4 m/5 cm.

* * * * *